US005594893A

United States Patent [19]
Byers et al.

[11] Patent Number: 5,594,893
[45] Date of Patent: Jan. 14, 1997

[54] SYSTEM FOR MONITORING AND CONTROLLING OPERATION OF MULTIPLE PROCESSING UNITS

[75] Inventors: Russell F. Byers; Joseph M. G. Duchaine; Michael L. Schuett, all of Ottawa, Canada; Cornelius J. Grootenboer, Bishop's Stortford, United Kingdom

[73] Assignee: Northern Telecom Limited, Montreal, Canada

[21] Appl. No.: 251,991

[22] Filed: Jun. 1, 1994

[51] Int. Cl.[6] ............................................. G06F 1/14
[52] U.S. Cl. ............................................. 395/557; 395/750
[58] Field of Search ............................ 395/500, 550, 395/575, 650, 700

[56] References Cited

U.S. PATENT DOCUMENTS 5,051,720  9/1991  Kittirutsunetorn ............... 340/310
5,329,579  7/1994  Brunson .............................. 379/88
5,359,730  10/1994  Marron ............................ 395/650

OTHER PUBLICATIONS

Reiss et al., "Unix System Administration Guide", Osborne McGraw-Hill, 1993, pp. 237–245.
Employees of the Mark Williams Company, "Coherent", 1982, pp. 47–48.
Harvey M. Deitel, "An Introduction to Operating Systems", Addison-Wesley Publishing Co., 1990, p. 587.

*Primary Examiner*—Thomas M. Heckler
*Assistant Examiner*—Dennis M. Butler
*Attorney, Agent, or Firm*—Dallas F. Smith; John A. Granchelli

[57] ABSTRACT

A processor shelf controller monitors processor shelf status. On shutdown or reset request either initiated by a central controller or the processor shelf, the processor shelf controller provides at least a first timer that allows the operating processor shelf sufficient time to shutdown operating system processes. For graceful shutdowns, a second timer is provided to allow the operating processor shelf to clear all application related processes prior to start of the first timer.

16 Claims, 7 Drawing Sheets

SYSTEM FOR MONITORING AND CONTROLLING OPERATION OF MULTIPLE PROCESSING UNITS

This invention relates to a processor shelf controllers and is particularly concerned supervisory functions.

BACKGROUND TO THE INVENTION

Several computer operating systems are well known to the point of being considered de facto industry standards. The acceptance of such systems means general purpose processor circuit boards and operating systems are readily available for use in configuring special purpose processors. Some applications for special purpose processors impose their own industry standards of practice and safety. Often these standards are incompatible with the requirements of the computer operating system being adapted.

The telecommunications industry, for example, has practices based upon over one hundred years of continuous evolutionary development, By contrast, the computer industry, and in particular that part of the industry dealing with multiprocessor technology, is relatively young. Therefore, in applying computer technology, at the operating system level, to an established industry like telecommunications, adaptations are required that at once meet the requirements of the operating system while conforming with industry practices.

An example of such an operating system is the UNIX operating system where UNIX is a trademark of AT&T.

SUMMARY OF THE INVENTION

An object of the present invention is to provide an improved processor shelf controller.

In accordance with an aspect of the present invention there is provided a processor shelf controller comprising: a microprocessor; a memory connected to the microprocessor via address and data busses; a plurality of transceivers connected to the processor for sending messages to and receiving responses from a plurality of processor shelves; a plurality of interfaces connected to the microprocessor for sensing shelf status and sending control signals to the shelves; and at least one timer, provided by the microprocessor, for allowing sufficient time for an operating processor shelf to shutdown operating system processes prior to the microprocessor sending a control signal to the processor shelf.

In accordance with another aspect of the present invention there is provided a method of controlling processor shelves comprising the steps of: auditing the status of the processor shelves; requesting shutdown of a particular processor shelf and starting a first timer; on expiry of the first timer, starting a second shutdown timer; and on expiry of the second timer sending a control signal to the processor shelf.

In an embodiment of the present invention the processor shelf controller is a frame supervisory controller.

An advantage of the present invention is allowing the use of a computer industry operating system in a telecommunications environment while providing for shutdown and reset of processors in a manner compatible with both the operating system and telecommunications practices.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
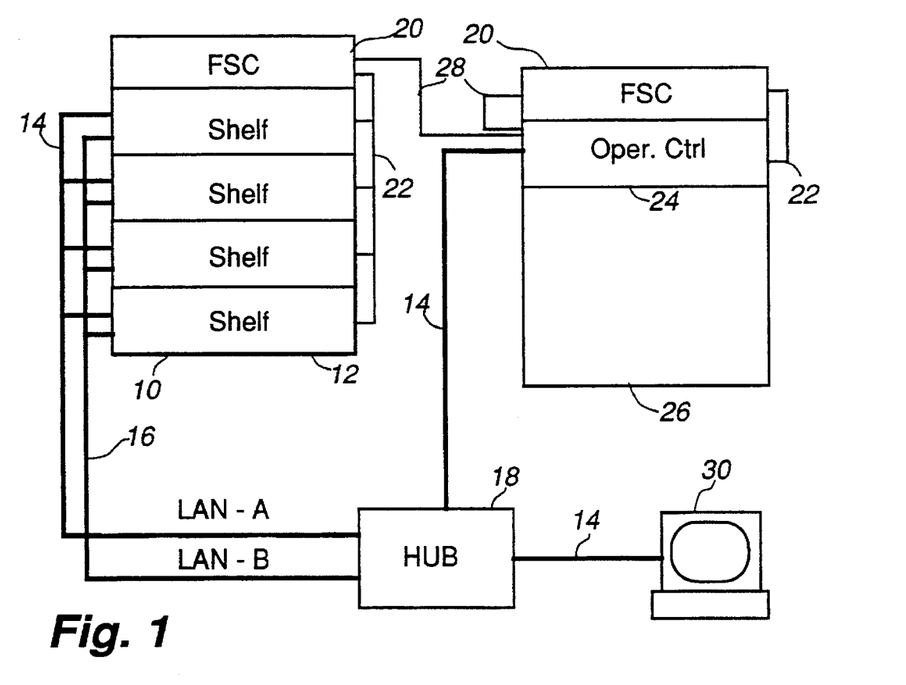
FIG. 1 illustrates in a block diagram a system level view of a multiprocessor arrangement including a processor shelf controller in accordance with an embodiment of the present invention.

Referring to FIG. 1, there is illustrated, in a block diagram, a system level view of a multiprocessor arrangement. The multiprocessors are housed in shelves 10 (four are shown in FIG. 1) which are in turn mounted in bays 12, with each bay 12 being connected via redundant local area networks (LAN) 14 and 16 to hubs 18. Shelves 10 in each bay 12 are monitored by a frame supervising controller (FSC) 20 via local serial links (LSL) 22. Overall operation and maintenance of bays 12 is provided by an operations controller 24 in an operations bay 26. The operations bay includes its own FSC 20. All FSCs 20 are connected to the operations controller 24 via remote serial links (RSL) 28. The operations controller 24 is also connected to hubs via LAN 14. A user interface terminal 30 is also connected to the hubs 18 via LAN 14.

In operation, for each shelf 10, the FSC 20 monitors the following indications of shelf state:

Power Converter Status (PC)

Circuit Breaker Status (BRKR)

local serial link status (CTS, LSL)

Shelf response to LSL audit messages.

Shelves 10 periodically report their operational states and their alarm status to the FSC 10 via LSL 22.

The FSC 20 is able to determine the presence of a shelf 10 on any of four allocated slots, either by configuration data received from the operations controller 24, or adaptively, whenever a shelf makes its presence known by booting and responding to audits.

Following a reset or power-on event the FSC 20 monitors the progress of the shelf 10 through its boot-up using a timer. If the shelf does not begin to respond to audits within a specified elapsed time, the shelf is tagged as faulty, and the operations controller is notified.

The FSC 20 periodically broadcasts audit messages via all four of its LSL 22. Once a shelf 10 is operational, it responds to each audit with a status message. In the event that the shelf 10 stops responding to audits, the FSC 20 sets an alarm on this shelf (polling failure) and reports this event to the operations controller 24. The operations controller 24 then decides if the shelf needs to be reset. If the operations controller is not available the FSC 20 always resets the shelf.

When a shelf 10 shutdown procedure has been initiated, the FSC 20 monitors the progress of the shelf through the steps associated with orderly shutdown of its processes, allowing the shelf enough time to complete its shutdown sequence, before physically resetting or removing power from the shelf.

Any shelf operational state change is reported to the operations controller 24 via the RSL 28, at a periodic interval.

Figure 2:
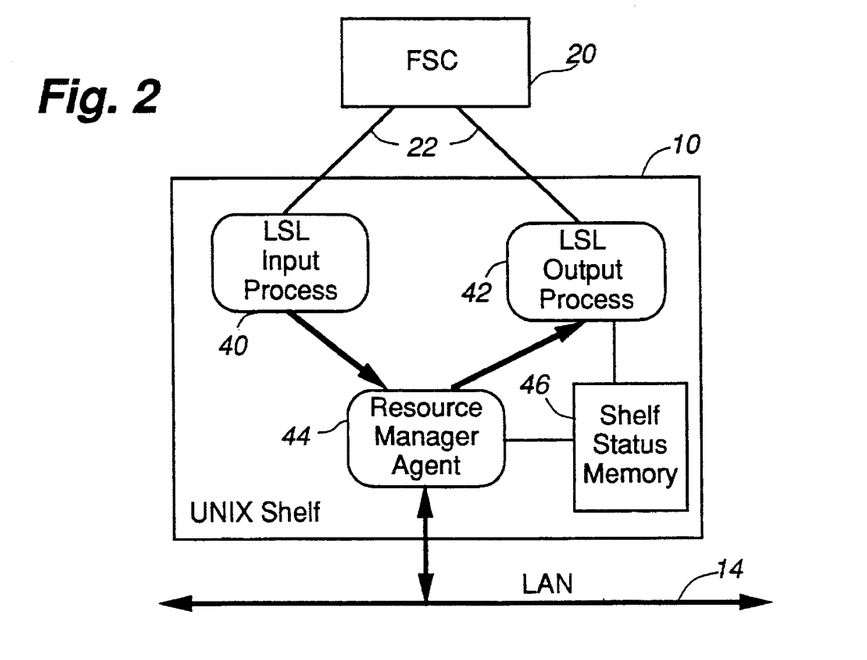
FIG. 2 illustrates in a block diagram the frame supervisory controller (FSC) and shelf of FIG. 1.

Referring to FIG. 2 there is illustrated in a block diagram the FSC and a shelf of FIG. 1. The shelf 10 includes LSL input and output processes 40 and 42 connected to the FSC 20 via the LSL 22. The LSL input processor is connected to a resource manager agent 44. The resource manager agent 44 is connected to the LAN 14. Shelf status information is stored in a shelf status memory 46 which is connected to both the resource manager agent 44 and the LSL output processors 42.

In operation, the LSL input process 40 receives messages from the FSC 20 over the LSL. The LSL output process 42 sends a shelf status message to the FSC 20 at regular timed intervals. The resource manager agent 44 updates the shelf status memory 46 to reflect the current status of the shelf 10. The LSL output process 42 copies the status information from the shelf status memory 46 into the shelf status message sent to the FSC 20.

Figure 3:
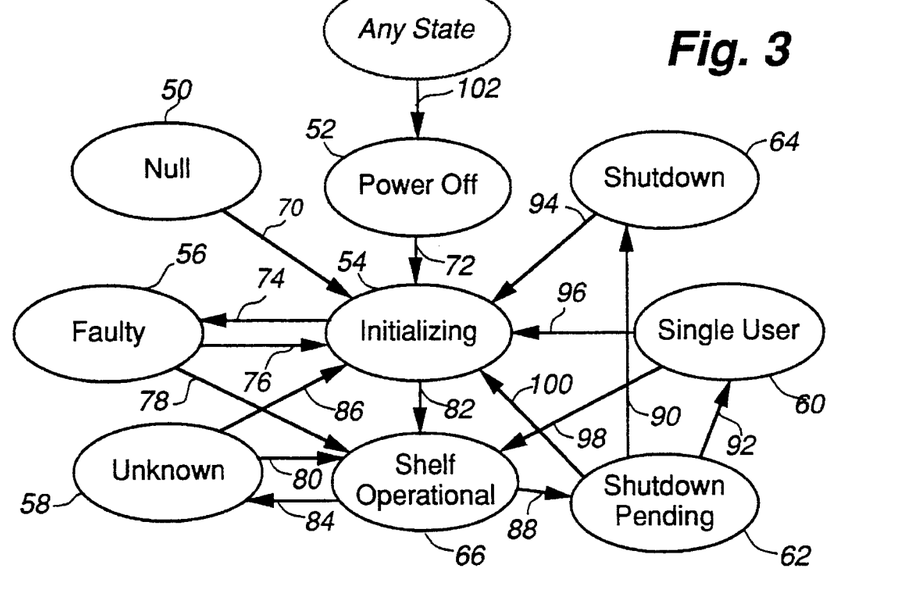
FIG. 3 illustrates in a state diagram the functional states of the processor shelves of FIGS. 1 and 2.

Referring to FIG. 3, there is illustrated in a state diagram the functional states of the shelf of FIG. 1 and FIG. 2. The state diagram of FIG. 3 is used to describe the shelf states and transitions used by the FSC 20 to monitor the shelf 10. In FIG. 3 the following shelf states are represented by ellipses.

Null 50—The FSC has no indication that there is a shelf 10 installed.

Power Off 52—The shelf° s breaker is turned off and there is no power converter output.

Initializing 54—The shelf 10 has been powered on or reset, and it is assumed to be in the process of initializing. A timer is set, and if it expires before the shelf 10 responds to audits, then it will be assumed faulty.

Faulty 56—Following a reset or power-on event, the shelf has failed to respond to audit messages after a specified amount of time has elapsed, and is assumed to have failed to start up.

Unknown 58—The shelf has ceased to respond to audit messages.

Single User 60—Following an explicit request by the operations controller 24 (or by the shelf itself), the shelf has been shut down to single user state. In this state the FSC does not expect audit responses even though the shelf is powered.

Shutdown Pending 62—Following a request to shut down, the shelf has indicated in an audit response message that it has started its shutdown process. Shutdown 64—Following a request to shut down, the shelf has indicated that shutdown has run to completion. Shelf Operational 66—The following shelf states are interpreted as "shelf operational" by the FSC 20:

Shelf initializing

In Service

In Service—Trouble

System Busy

System Busy—Pending

Man Busy

Man Busy—Pending

Test

FIG. 3 also illustrates the transitions between states as follows:

Null→Initializing 70—A shelf that was not previously known to the FSC 20 is powered on.

Power Off→Initializing 72—Power was applied to the shelf.

Initializing→Faulty 74—The shelf boot timer expired, before the shelf 10 had started to respond to FSC audit messages.

Faulty→Initializing 76—The shelf 10 is reset by the FSC 20 upon receiving a reset request event.

Faulty→Shelf Operational 78—After having been tagged as faulty, the shelf 10 begins to respond to FSC 20 audit messages Unknown→Shelf Operational 80—The shelf 10 recovers from an audit failure by starting to respond to FSC 20 audit messages, without intervention by the FSC 20.

Initializing→Shelf Operational 82—The shelf 10 begins responding to FSC 20 audits.

Shelf Operational→Unknown 84—The shelf 10 ceases to respond to FSC 20 audit messages for a specified period of time.

Unknown→Initializing 86—The shelf 10 is reset by the FSC 20, upon receiving a reset request event. If the operations controller 24 is unavailable, the FSC 20 may execute the reset automatically.

Shelf Operational→Shutdown Pending 88—Following a request to shutdown, in a graceful or forced manner, the shelf 10 has acknowledged the request by declaring its internal state to be shutdown pending.

Shutdown Pending→Shutdown 90—The shelf 10 has indicated in its last status message that it has completed its process shutdown. In practice, the FSC 20 may or may not receive this state indication from the shelf is about to be physically reset or powered off. This transition may also be triggered by the expiry of the forced shutdown timer, or expiry of the CTS Inactive timer.

Shutdown Pending→Single User 92—Following a request to enter single user state, the shelf 10 has completed its shutdown process, and its LSL 22 has been deactivated.

Shutdown→Initializing 94—The shelf 10 is reset by the FSC 20, on a timeout event. One of three timers can cause this event; the Audit Fail timer, the CTS Inactive timer, or the Forced Shutdown timer.

Single User→22 Initializing 96—The shelf 10 is reset by the FSC 20 upon receiving a reset request event.

Single User→Shelf Operational 98—From single user state, the shelf 10 begins to respond to FSC 20 audit messages.

Shutdown Pending→Initializing 100—The shelf 10 is reset by the FSC 20, on a timeout event. One of three timers can cause this event; the Audit Fail timer, the CTS Inactive timer, or the Forced Shutdown timer.

Any State→Power Off 102—Physically depowering the shelf 10 by any means will cause it to enter the power off state, regardless of what state it was in before. The FSC 20, under normal circumstances, will only cause a transition to the power off state from the same states that have transition to Initializing, namely: Faulty, Unknown, Single User, Shutdown Pending, and Shutdown. Under the forcing condition of a critical cooling unit failure, the FSC 20 may shut a shelf 10 down from the Initializing state.

The FSC 20 uses XON/XOFF control byte messages to audit shelves 10. XON/OFF is a commonly used RS232 flow control protocol. The four LSL links 22 are polled in round-robin fashion using XON/XOFF. If a shelf's LSL processes are running, the shelf 10 responds by sending a shelf status message in response to each XON message. The shelf status message contains information about the shelf's internal state. Audits take place periodically at the rate of about once every few seconds, as specified by datafill.

The FSC 20 uses the message $FSC_{13}shelf_{13}shutdown$ to induce a shelf to start a graceful shutdown, and $FSC_{13}shelf_{13}shutdown_{13}force$ to initiate a forced shutdown. A shutdown request originating at the operations controller 24 is sent first to the FSC 20 as a $MSP_{13}maintenance_{13}action$ message with arguments to specify the required type of shutdown (reset, power-off).

Whenever a shelf 10 declares a change of internal state, or the FSC 20 infers that the shelf state has changed, it notifies the operations controller 24 by sending it a $FSC_{13}notify_{13}shelf_{13}state$ message over the RSL 28. Whenever the FSC 20 physically resets or powers off a shelf, it notifies the operations controller 24 by sending a $FSC_{13}notify_{13}OffReset$ message over the RSL 28.

A number of software timers are used by the FSC 20 to track the progress of shelves 10 through shutdown and startup procedures. Timer periods are controlled by configuration data, and can be modified by the operations controller 24, should the operating characteristics of the system change. The following lists the key timers used in shelf supervision.

Shelf Boot Timer—This timer specifies the maximum interval a shelf 10 may take before responding to FSC 20 audits, following a power-on or bus reset. If the timer expires before the shelf 10 responds to its first audit, it is tagged "faulty", and the operations controller 24 is notified.

Audit Fail Timer—This timer is derived from two parameters; Tpoll, the interval between audits, and Npoll the number of consecutive audit failures to determine that the shelf 10 has failed. If a shelf ceases responding to audits for an interval of Npoll * Tpoll, it is considered to have stopped operating.

Graceful Shutdown Timer—This timer marks maximum elapsed time from the moment a shelf 10 is first requested to gracefully shut down until there is only sufficient time left to execute a forced shutdown of processes.

Forced Shutdown Timer—The forced shutdown timer marks the interval taken by a shelf 10 to shut its processes down as quickly as possible. If a shelf 10 fails to shut down before this timer expires, it is assumed to be faulty and the terminating action (reset or power-off) takes place.

CTS Inactive Timer—Even though the shelf LSL input and output processes 40 and 42 that respond to FSC 20 audit messages are among the last to be shutdown, some additional time is required following their deactivation before the shelf 10 can be assumed to have terminated all processes. This timer marks an interval from the moment the LSL 22 is deactivated (CTS dropped or audit fails). When the timer expires, the shelf 10 can be safely reset or powered off.

Figure 4:
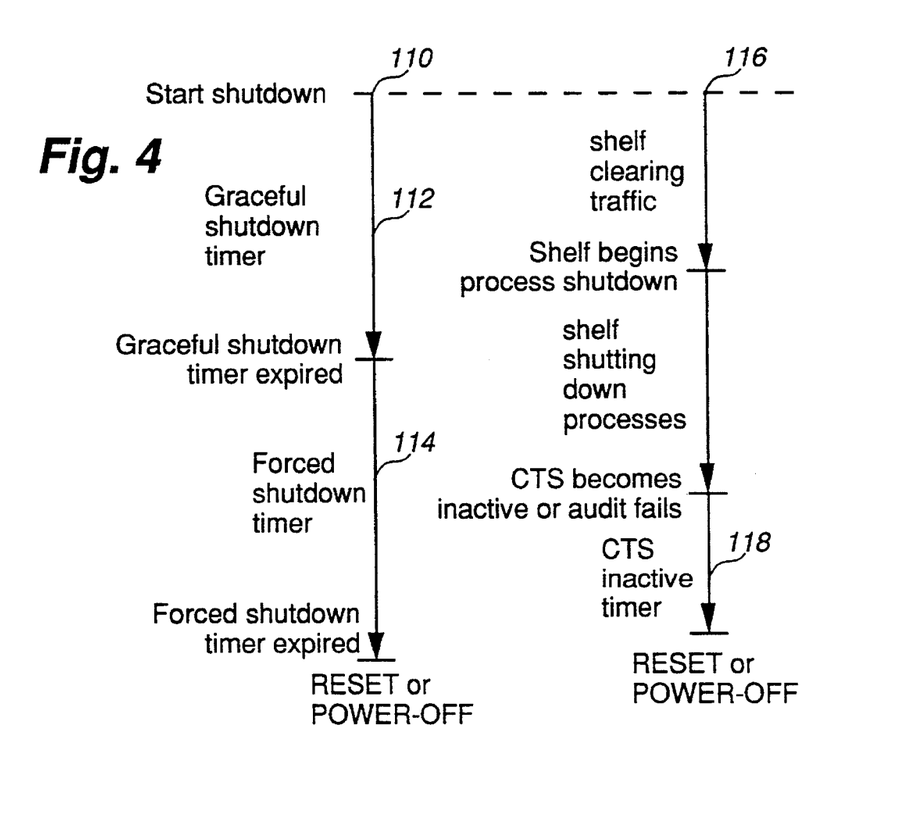
FIG. 4 graphically illustrates an example of timer and state progressions for a graceful shutdown of a processor shelf in accordance with an embodiment of the present invention.

Timers Example—Referring to FIG. 4, there is graphically illustrated an example of timer and shelf state progressions for a graceful shutdown. The left track 110 shows the progression of the graceful 112 and forced shutdown timers 114 that stake out the maximum time the shelf 10 is allowed to shut down. The right track 116 shows the progression of the shelf's shutdown procedure, followed by the CTS Inactive timer 118, which kicks in at the end of the process. In this case, the shelf takes less than the maximum time allowed to shut down.

Referring to FIGS. 5, 6, 7, and 8 there are illustrated in annotated message sequence charts the message interactions between the FSC 20 and a shelf 10 it is supervising, and the message-interactions between the FSC 20 and the operations controller 24. In these charts, the progression of time is represented by vertical dimension. The sequence of events in the scenario flows from top to bottom. Time intervals are not shown to scale.

Figure 5:
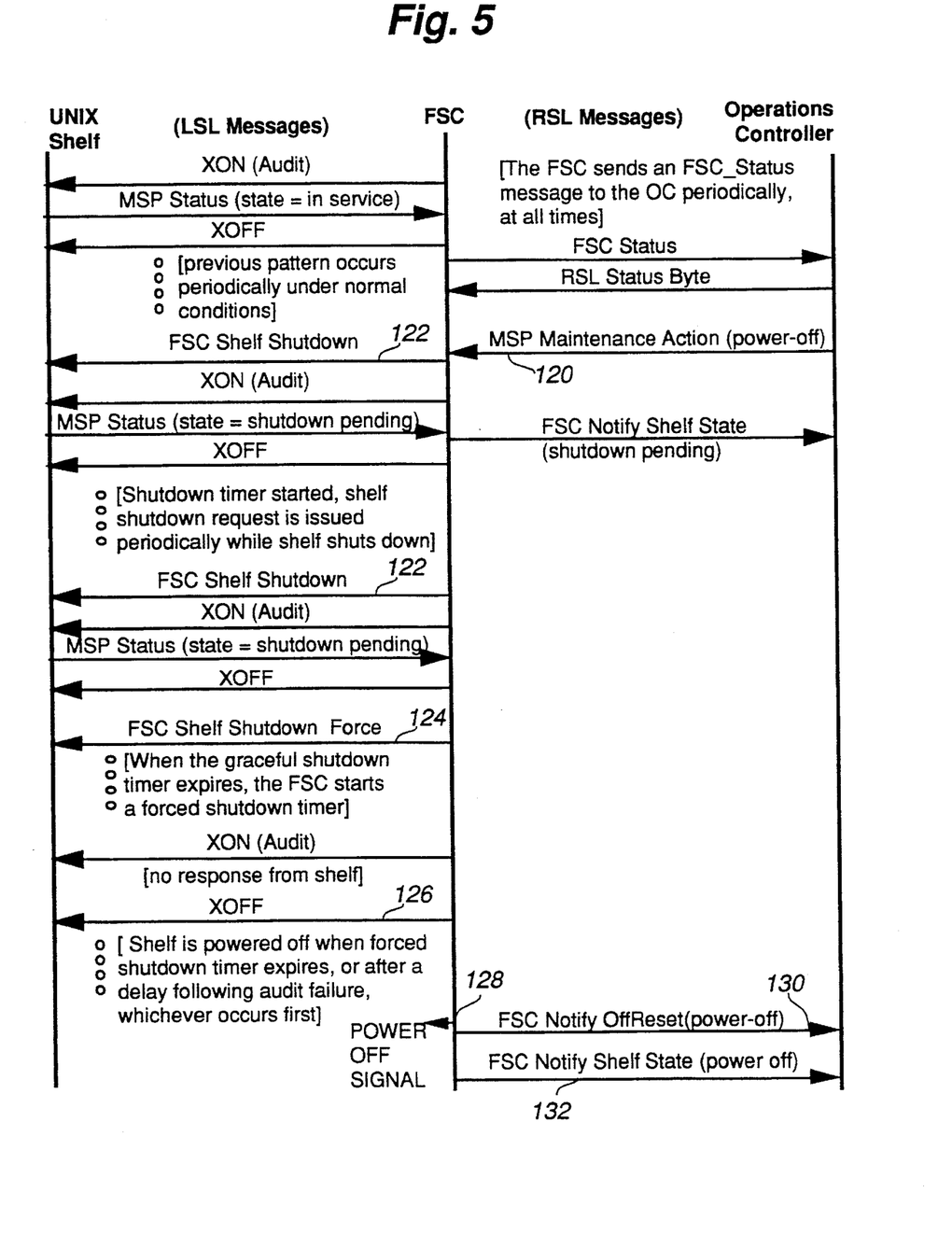
FIG. 5 illustrates in an annotated message sequence chart an example of a shelf powerdown.

Referring to FIG. 5, there is illustrated a shelf powerdown. The operations controller 24 sends a message 120 to the FSC 20, requesting that a shelf 10 be shut down gracefully, then powered off. The FSC 20, having determined that the shelf 10 is alive and responding to audit messages, issues a shutdown request 122 to the targeted shelf, which then begins to clear service traffic and shutdown its software processes.

Graceful shutdown occurs in two stages. First the shelf 10 is allotted some time (typically several minutes) to clear out any service-related traffic. The FSC 20 marks this interval with a timer, the graceful shutdown timer 112. When the timer 112 expires, the FSC 20 issues a forced shutdown request 124 to the shelf 10. Assuming the timer 112 is properly matched to system characteristics, the shelf 10 will, by this time, have already begun to shut down its processes.

The FSC 20 starts a timer, the forced shutdown timer 114, to mark the forced shutdown interval. If the timer value has been properly configured, the shelf 10 will complete its shutdown before the timer 114 expires. Even if it fails to complete shutdown, the FSC 20 will power off the shelf 10 upon timer 114 expiry. The shelf's LSL processes 40 and 42 are left running until shutdown is nearly complete. Once the LSL processes 40 and 42 are taken down, the FSC 20 detects repeated audit failures 126. The CTS signal also goes away, indicating that the LSL link 22 has been disabled. These events prompt the FSC 20 to start another timer, the CTS timer 118, that allows it to power off the shelf after a brief delay, in advance of the forced shutdown timer 114 expiring. In other words, the shelf 10 is powered off as soon as it is ready, even if the amount of time taken is less than the maximum amount originally allotted to it.

The operations controller 24 is sent notification messages whenever the shelf's state changes 130, and at the moment the shelf is physically powered off 132 by the FSC 20.

Figure 6:
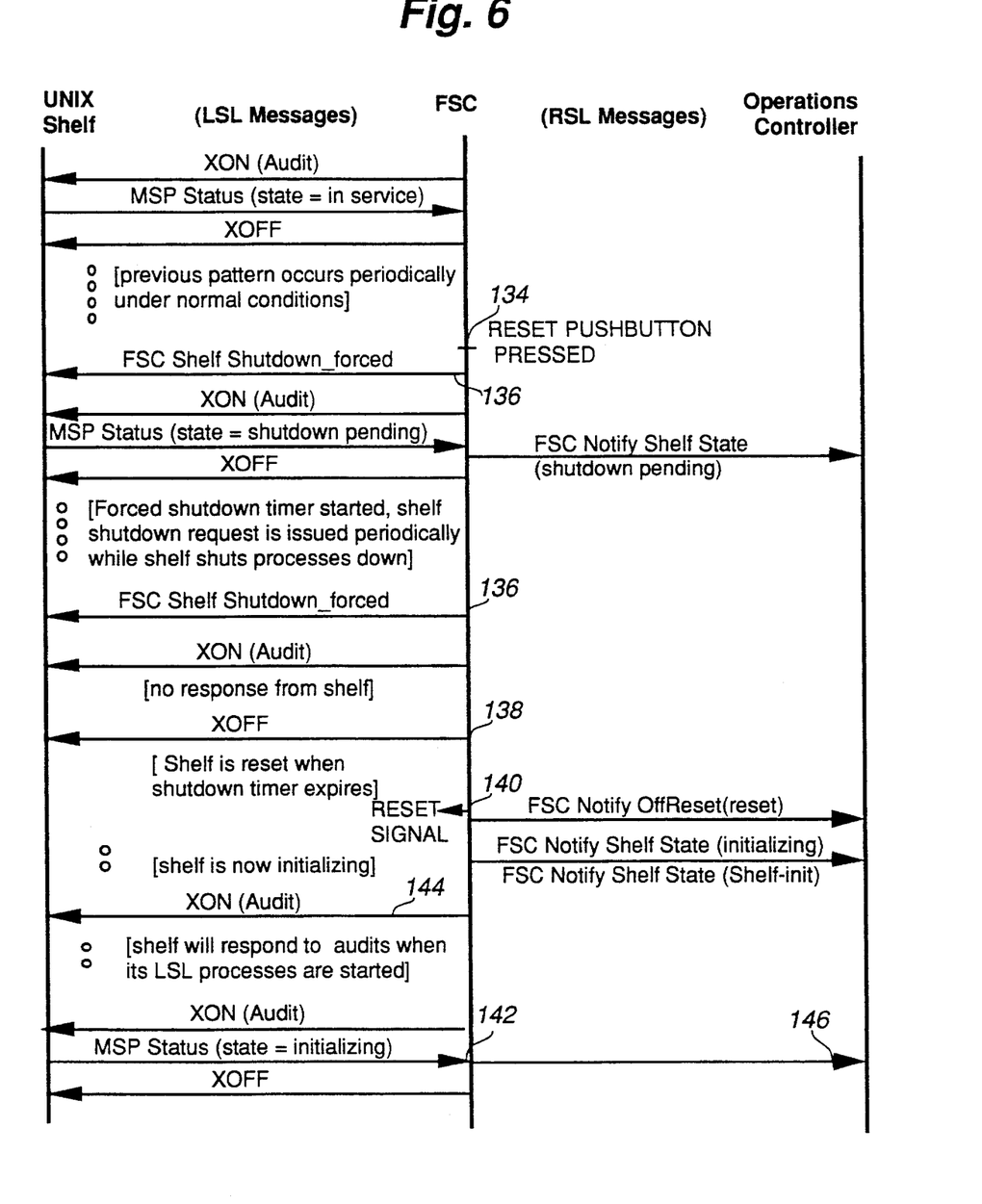
FIG. 6 illustrates in an annotated message sequence chart an example of a shelf reset.

FIG. 6 illustrates a shelf reset. In this example, a reset action is requested by pressing a RESET button, located at the shelf 10. A reset or power-off initiated at the shelf is by definition a forced shutdown; the shelf 10 is required to start shutting down its processes as quickly as possible. A forced reset can also be requested by the operations controller 24. The message sequence chart for the shutdown process and for the shelf initialization that follows the physical reset.

Upon receiving a reset request from the shelf RESET button, the FSC 20 determines that the shelf 10 is in a normal operational state, starts sending forced shutdown messages 136 to the shelf 10, and starts a timer 114 to mark the interval taken for the action. If the timer value has been properly configured, the shelf 10 will complete its shutdown before the timer expires. Even if the shelf 10 fails to complete its shutdown, the FSC 20 will reset the shelf upon timer 114 expiry.

The shelf's LSL processes 40 and 42 are left running until shutdown is nearly complete. Once the LSL processes 40 and 42 are taken down, the FSC 20 detects repeated audit failures 138. The CTS signal also goes away, indicating that the LSL link 22 has been disabled. These events prompt the FSC 20 to start another timer, the CTS timer 118 that allows it to reset 140 the shelf 10 after a brief delay, in advance of the forced shutdown timer 114 expiring. In other words, the shelf is reset 140 as soon as it is ready, even if the amount of time taken is less than the amount originally allotted for the shutdown.

The shelf 10 immediately starts initializing itself 142 upon being reset, and the FSC 20 continues to send it audit messages. The shelf 10 begins responding to audits once it has restarted its LSLinput 40 and LSLoutput 42 link handling processes. The FSC 20 also starts a timer to mark the interval taken by the shelf 10 to initialize and respond to audits following the reset signal. If the shelf 10 has failed to respond to audits when the timer expires, the FSC 20 sends a message to the operations controller 24, indicating that the shelf's state has changed to faulty. In the example of FIG. 6, the shelf initializes normally, and begins to respond before the timer expires. The FSC 20 sends a message 146 to the operations controller 24 that the shelf is initializing itself.

Figure 7:
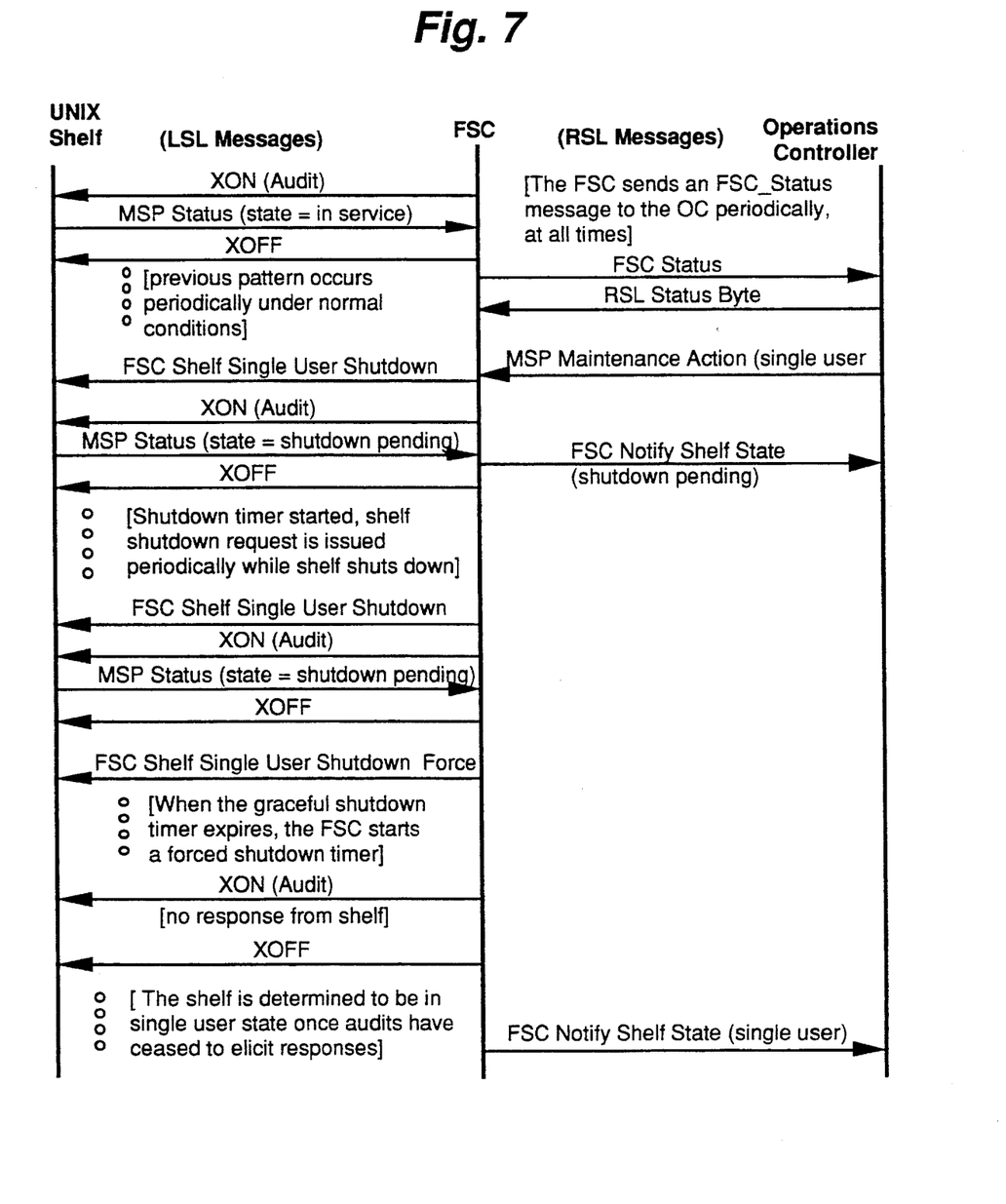
FIG. 7 illustrates in an annotated message sequence chart an example of a shutdown to a single user state.

Referring to FIG. 7 there is illustrated an example of a shutdown to single user state. The single user state is described in Unix administration manual in sections on init and shutdown. The LSLinput and LSLoutput processes 40 and 42 are not supported in single user state, which is typically used for administration functions. The procedure for shutting an operational Unix shelf down to single user state is very similar to the other shutdown procedures, the primary difference being that the shelf 10 is not powered off or reset following the shutdown of software processes. Once put in single user state, the shelf 10 is assumed to remain in that state until it provides the FSC 20 with an indication that it has changed states. A change of state would typically be indicated by removal of power from the shelf, or by the shelf commencing to respond to FSC 20 audit messages.

Figure 8:
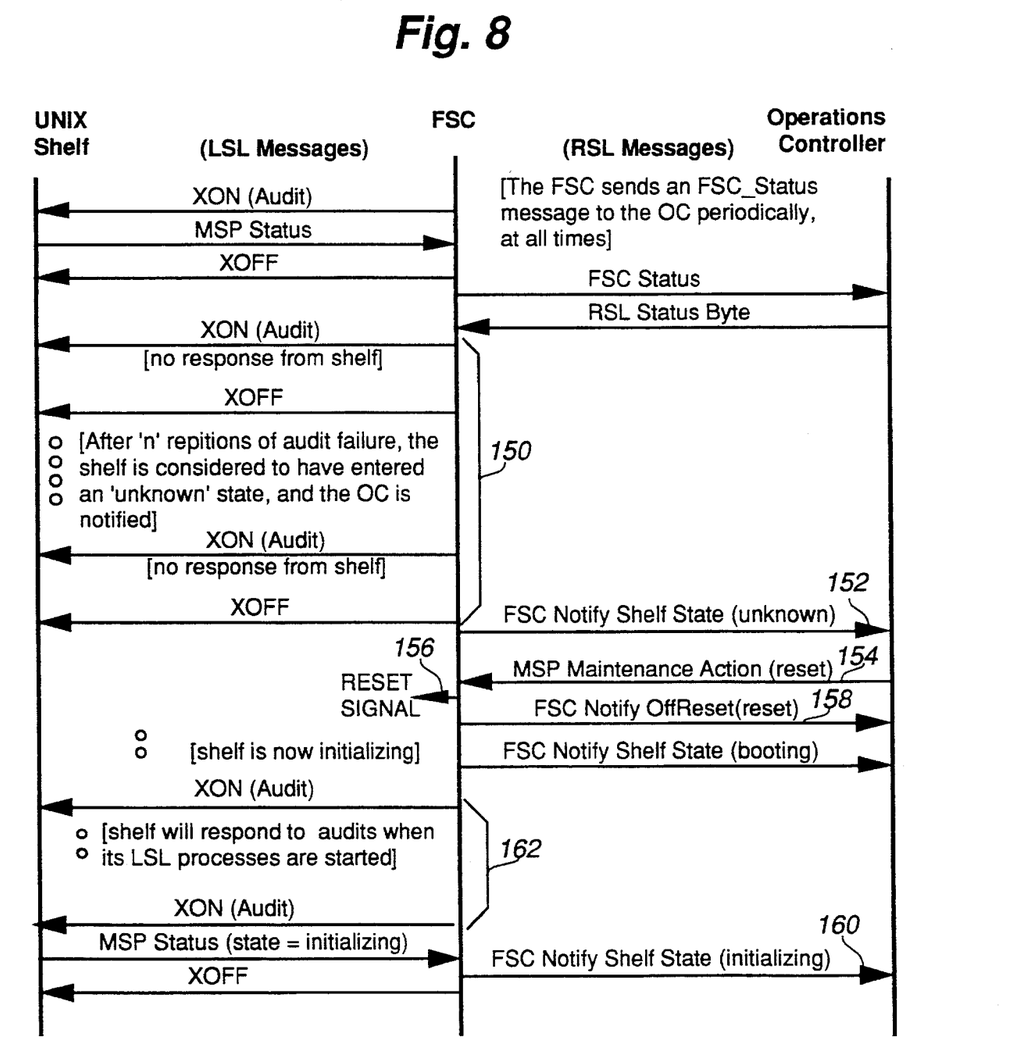
FIG. 8 illustrates in an annotated message sequence chart an example of a shelf reset following an audit failure.

Referring to FIG. 8 there is illustrated the sequence of interactions that typically occur when a shelf 10 stops responding to the FSC 20 audits. A shelf 10 is determined to have gone into unknown state if it fails a series of N consecutive audit attempts, N being specified as part of the FSC 20 configuration data. Upon detecting audit failure, the FSC 20 notifies the operations controller 24, and awaits further instructions, meanwhile attempting to audit the shelf 10 as before. Usually the operations controller 24 will attempt to recover the shelf 10 by requesting that the FSC 20 reset it. If the operation is unavailable to the system, the FSC 20 physically resets the shelf if it is in unknown state. Following reset, the FSC 20 notifies the operations controller 24 of the reset event and the change in shelf state to initializing, and continues to poll the shelf 10, while it recovers.

Figure 9:
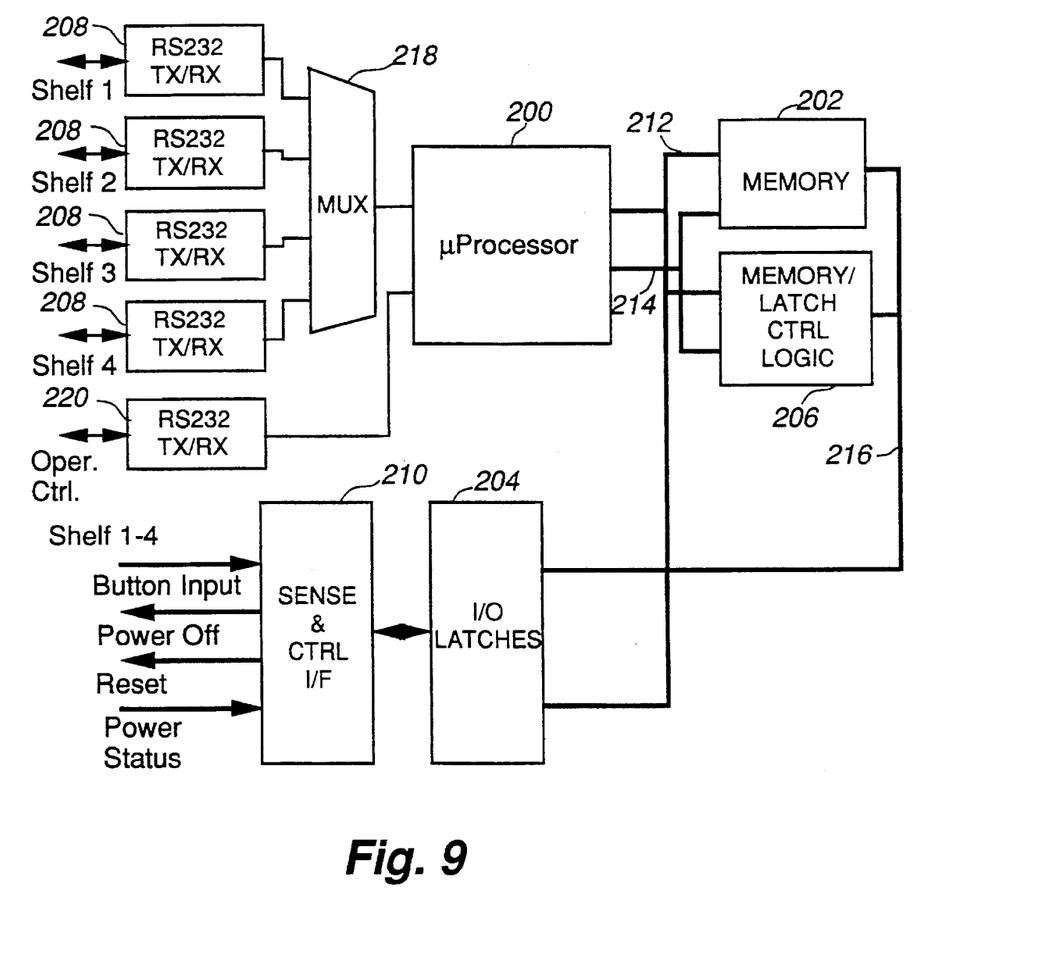
FIG. 9 illustrates in a block diagram a frame supervisory controller (FSC) in accordance with an embodiment of the present invention.

Referring to FIG. 9, there is illustrated in a block diagram a frame supervisory controller (FSC) in accordance with an embodiment of the present invention. The FSC includes a microprocessor 200, for example an MC68302 by Motorola, a memory 202, input/output latches 204, memory and latch control logic 206, serial ports 208 and sensing/control interfaces 210. The microprocessor 200 is connected to the memory via address and data busses 212 and 214. The memory and latch control logic 206 and input/output latches 204 are also connected to the data bus 214. A control bus 216 connects the memory and latch control logic 206 to the memory 202 and the input/output latches 204. The microprocessor communicates with the shelves via a MUX 218 and serial ports 208. The microprocessor communicates with the operations controller 24 via serial port 220.

In operation, shelf status is monitored by the microprocessor 20 via sensing and control interfaces 210, input/output latches 204 and the data bus 214. Messages to the shelves 10 are sent and acknowledgements received via RS232 transceivers 208. The memory 202 is divided into PROM for storing configuration data, PROM for storing program and static RAM. The microprocessor 200 provides the graceful shutdown timer 112 and the forced shutdown timer 114 based upon configuration data. The graceful shutdown timer allows sufficient time for a processor shelf to clear all of its application related processes. The forced shutdown timer provides just sufficient time for an operating processor shelf to shutdown it operating system processes in a manner which prevents file corruption.

An advantage of the present invention is allowing the use of a computer industry operating system in a telecommunications environment while providing for shutdown and reset of processors in a manner compatible with both the operating system and telecommunications practices.

Numerous modifications, variations and adaptations may be made to the particular embodiments of the invention described above without departing from the scope of the invention, which is defined in the claims.

What is claimed is:

1. A controller unit for monitoring and controlling operation of a plurality of processing units, comprising:

means for determining status of the processing units which are physically separate from the controller unit and communicatively coupled thereto;

means, responsive to the determined status reflecting failure of a particular processing unit, for controlling through the communicative coupling the failed unit to initiate a shutdown procedure and for initiating a timer; and means, responsive to the timer measuring a predetermined time interval, for resetting or powering off the failed unit.

2. A controller unit as claimed in claim 1, wherein the means for determining status includes:

means for periodically auditing through the communicative coupling the processing units for their status;

means for receiving a unit status message from each processing unit which responds to being audited; and means for establishing from internal state information contained in each unit status message whether that processing unit has failed.

3. A controller unit as claimed in claim 2, wherein the means for determining status includes means for establishing that a processing unit has failed when it does not respond to being audited.

4. A controller unit as claimed in claim 3, comprising means, responsive to repeated audit failures initiating another timer; and wherein the means for resetting or powering off the failed unit is responsive either to the timer measuring the predetermined time interval or to the another timer measuring another predetermined time interval.

5. A controller unit for monitoring and controlling operation of a plurality of processing units, comprising:

means for determining status of the processing units which are physically separate from the controller unit and communicatively coupled thereto;

means, responsive to the determined status reflecting failure of a particular processing unit, for sending a graceful shutdown message to the failed unit and for initiating a first timer whereby the failed unit is given a predetermined first time interval to clear away active processes;

means, responsive to the first timer measuring the first time interval, for sending a forced shutdown message to the failed unit and initiating a second timer whereby the failed unit is given a predetermined second time interval to terminate active processes; and means, responsive to the second timer measuring the second time interval, for resetting or powering off the failed unit.

6. A controller unit as claimed in claim 5, wherein the means for determining status includes:

means for periodically auditing through the communicative coupling the processing units for their status;

means for receiving a unit status message from each processing unit which responds to being audited; and means for establishing from internal state information contained in each unit status message whether that processing unit has failed.

7. A controller unit as claimed in claim 6, wherein the means for determining status includes means for establishing that a processing unit has failed when it does not respond to being audited.

8. A controller unit as claimed in claim 7, comprising means, responsive to repeated audit failures subsequent to sending the forced shutdown message, for initiating a third timer; and wherein the means for resetting or powering off the failed unit is responsive either to the second timer measuring the second time interval or to the third timer measuring a predetermined third time interval.

9. A method for a controller unit to monitor and control operation of a plurality of processing units, comprising the steps of, at the controller unit:

determining status of the processing units which are physically separate from the controller unit and communicatively coupled thereto;

responsive to the determined status reflecting failure of a particular processing unit, controlling through the communicative coupling the failed unit to initiate a shutdown procedure and initiating a timer; and responsive to the timer measuring a predetermined time interval, resetting or powering off the failed unit.

10. A method as claimed in claim 9, wherein the step of determining status includes:

periodically auditing through the communicative coupling the processing units for their status;

receiving a unit status message from each processing unit which responds to being audited; and establishing from internal state information contained in each unit status message whether that processing unit has failed.

11. A method as claimed in claim 10, wherein the step of determining status includes establishing that a processing unit has failed when it does not respond to being audited.

12. A method as claimed in claim 11, comprising, responsive to repeated audit failures subsequent to initiation of the shutdown procedure, initiating another timer; and wherein resetting or powering off the failed unit is responsive either to the timer measuring the predetermined time interval or to the another timer measuring another predetermined interval.

13. A method for a controller unit to monitor and control operation of a plurality of processing units, comprising the steps of, at the controller unit:

determining status of the processing units which are physically separate from the controller unit and communicatively coupled thereto;

responsive to the determined status reflecting failure of a particular processing unit, sending a graceful shutdown message to the failed unit and initiating a first timer whereby the failed unit is given a predetermined first time interval to clear the away active processes;

responsive to the first timer measuring the first time interval, sending a forced shutdown message to the failed unit and initiating a second timer whereby the failed unit is given a predetermined second time interval to terminate active processes; and responsive to the second timer measuring the second time interval, resetting or powering off the failed unit.

14. A method as claimed in claim 13, wherein the step of determining status includes:

periodically auditing through the communicative coupling the processing units for their status;

receiving a unit status message from each processing unit which responds to being audited; and establishing from internal state information contained in each unit status message whether that processing unit has failed.

15. A method as claimed in claim 14, wherein the step of determining status includes establishing that a processing unit has failed when it does not respond to being audited.

16. A method as claimed in claim 15, comprising, responsive to repeated audit failures subsequent to sending the forced shutdown message, initiating a third timer; and wherein resetting or powering off the failed unit is responsive either to the second timer measuring the second time interval or to the third timer measuring a predetermined third time interval.

* * * * *